(12) United States Patent
Suzuki et al.

(10) Patent No.: US 7,379,121 B2
(45) Date of Patent: May 27, 2008

(54) SIGNAL TRANSMITTING DEVICE AND SIGNAL RECEIVING DEVICE

(75) Inventors: Hidekazu Suzuki, Yamatokoriyama (JP); Toshiro Nishio, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 676 days.

(21) Appl. No.: 10/088,586

(22) PCT Filed: Jul. 23, 2001

(86) PCT No.: PCT/JP01/06339

§ 371 (c)(1),
(2), (4) Date: Jul. 9, 2002

(87) PCT Pub. No.: WO02/09443

PCT Pub. Date: Jan. 31, 2002

(65) Prior Publication Data

US 2002/0171761 A1     Nov. 21, 2002

(30) Foreign Application Priority Data

Jul. 21, 2000     (JP)     ............................. 2000-220749

(51) Int. Cl.
*H04N 5/38* (2006.01)
(52) U.S. Cl. ...................... 348/723; 348/484; 348/473; 348/512
(58) Field of Classification Search ................ 348/484, 348/488–489, 476–480, 462, 723
See application file for complete search history.

(56) References Cited

U.S. PATENT DOCUMENTS 4,652,903 A * 3/1987 Lucas ......................... 348/489
5,757,416 A * 5/1998 Birch et al. .................. 725/144
5,857,056 A * 1/1999 Iwami et al. .................. 386/33

(Continued)

FOREIGN PATENT DOCUMENTS

EP     0 598 295     5/1994

(Continued)

OTHER PUBLICATIONS

Fibush, D. K.: "Integrating Digital Audio Into the Serial Digital Video Signal", SMPTE Journal, SMPTE Inc., Scarsdale, N.Y., US, vol. 103, No. 9, Sep. 1, 1994, pp. 574-579, XP000445483.

(Continued)

*Primary Examiner*—Trang U. Tran
(74) *Attorney, Agent, or Firm*—Wenderoth, Lind & Ponack, L.L.P.

(57) ABSTRACT

In a signal transmitter and a signal receiver, a multiplexing part multiplexes a video signal and a time-base-compressed audio signal on the basis of a multiplexing control signal to transmit the multiplexed signal through a data line in the signal transmitter, and a demultiplexing part demultiplexes a video/audio multiplexed signal received through the data line into the original video signal and audio signal by a demultiplexing control signal in the signal receiver. According to the so-configured signal transmitter and signal receiver, it is possible to realize a signal transmission system compliant with the DVI standard, in which the audio signal as well as the video signal can be transmitted.

3 Claims, 17 Drawing Sheets

U.S. PATENT DOCUMENTS

| | | | | |
|---|---|---|---|---|
| 5,929,921 A | * | 7/1999 | Taniguchi et al. | 348/484 |
| 6,009,305 A | * | 12/1999 | Murata | 725/114 |
| 6,388,717 B1 | * | 5/2002 | Seccia | 348/723 |
| 6,839,055 B1 | * | 1/2005 | Nguyen | 345/204 |
| 2003/0032392 A1 | * | 2/2003 | Suzuki | 455/39 |

FOREIGN PATENT DOCUMENTS

| | | |
|---|---|---|
| JP | 54116834 | 9/1979 |
| JP | 61269583 | 11/1986 |
| JP | 03107222 | 5/1991 |
| JP | 04364686 | 12/1992 |
| JP | 06-078280 * | 3/1994 |
| JP | 06078280 | 3/1994 |
| JP | 06233265 | 8/1994 |
| JP | 6-303552 | 10/1994 |
| WO | 97/48056 | 12/1997 |
| WO | 00/14626 | 3/2000 |

OTHER PUBLICATIONS

"Digital Visual Interface DVI", Digital Visual Interface DVI, Revision 1.0, Apr. 2, 1999, pp. 1-76, XP002907715.

* cited by examiner

SIGNAL TRANSMITTING DEVICE AND SIGNAL RECEIVING DEVICE

TECHNICAL FIELD

The present invention relates to a signal transmitter and a signal receiver.

BACKGROUND ART

A conventional signal transmission system according to DVI (Digital Visual Interface) standard will be described with reference to FIG. 26. FIG. 26 is a diagram illustrating a structure of the conventional transmission system.

In this figure, numerals 2601 to 2603 denote TMDS encoders/serializers provided at the transmitting end, which TMDS-encode inputted component signals such as RED, GREEN, and BLUE signals, serialize the encoded signals, and output the same to transmission lines. Numerals 2604 to 2606 denote TMDS decoders/recoverer provided at the receiving end, which TMDS-decode the received signals, recover the decoded signals, and restore the component signals.

A DE (Data Enable) signal is a signal indicating a period during which the component signal such as RED, GREEN, and BLUE signals exists, and this is a HIGH active signal. For example, the DE signal is LOW in a period of a horizontal synchronizing signal or vertical synchronizing signal of video.

CTL (Control) signals CTL 0, CTL 1, CTL 2, and CTL 3 are prepared as control signals. However, these signals are not in use in the present DVI standard. More specifically, the levels of the signals are always 0.

The so-configured conventional signal transmission system will be described.

The TMDS encoders/serializers 2601 to 2603 at the transmitting end convert video signals (RGB signals) inputted at 8 bits into signals of 10 bits, serialize the converted signals, and output them to transmission lines. The object of the 8 bit-to-10 bit conversion is to reduce data changing points and convert the data into a format that is suitable for high-speed transmission. Further, the TMDS encoders/serializers 2601 to 2603 convert the 2 bit-CTL signals into 10 bit-CTL signals and transmit the converted CTL signals to the transmission lines. The DE signals are also encoded, serialized, and transmitted to the transmission lines.

The TMDS decoders/recoverers 2604 to 2606 at the receiving end decode 10-bit serial data received through the transmission lines into the 8-bit color signals, the DE signals, and the 2-bit CTL signals to decompress the signals.

However, the DVI standard is a standard for transmitting only video signals, and the conventional signal transmission system cannot transmit audio signals.

The present invention is made to solve the above-mentioned problem and has for its object to provide a signal transmitter and a signal receiver that can realize a signal transmission system according to the DVI standard in which audio signals as well as video signals can be transmitted.

SUMMARY OF THE INVENTION

According to a first aspect of the present invention, there is provided a signal transmitter which is connected to a signal receiver via a transmission line, comprising: a time-base compression means for time-base-compressing a first signal; a multiplexing control signal generator for generating a multiplexing control signal on the basis of a second signal; a signal multiplexing means for multiplexing the time-base-compressed first signal, the second signal and a third signal, employing the multiplexing control signal generated by the multiplexing control signal generator, and outputting a multiplexed signal; and a signal transmitting means for transmitting the multiplexed signal and the multiplexing control signal to the signal receiver.

Therefore, it is possible to realize a signal transmission system which transmits the first, second and third signals through the same transmission line.

According to a second aspect of the present invention, there is provided a signal transmitter which is connected to a signal receiver via a transmission line, comprising: a time-base compression means for time-base-compressing a first signal; a multiplexing control signal generator for generating a multiplexing control signal on the basis of a second signal; a signal multiplexing means for multiplexing the time-base-compressed first signal, the second signal and a third signal, employing the multiplexing control signal generated by the multiplexing control signal generator, and outputting a multiplexed signal; and a signal transmitting means for transmitting the multiplexed signal to the signal receiver.

Therefore, it is possible to realize a signal transmission system which transmits the first, second and third signals through the same transmission line, without transmitting the multiplexing control signal to the signal receiver.

According to a third aspect of the present invention, in the signal transmitter as defined in the first or second aspects, the first signal is an audio signal, the second signal is a horizontal synchronizing signal or a vertical synchronizing signal, and the third signal is a video signal.

Therefore, it is possible to realize a signal transmission system according to DVI standard, which can transmit the audio signal as well as the video signal.

According to a fourth aspect of the present invention, there is provided a signal transmitter according to DVI transmission standard which transmits RGB video signals as serial data having: a first mode of transmitting the RGB video signals as serial data, and a second mode of transmitting three signals corresponding to a luminance signal, a color difference signal and an audio signal, and comprising a switching means for switching between the first mode and the second mode.

Therefore, it is possible to realize a signal transmission system according to the DVI standard, which can transmit the audio signal as well as the video signal.

According to a fifth aspect of the present invention, there is provided a signal receiver which is connected to a signal transmitter via a transmission line, comprising: a first receiving means for receiving a multiplexed signal in which a time-base-compressed first signal, a second signal, and a third signal are multiplexed, from the signal transmitter; a second receiving means for receiving a multiplexing control signal from the signal transmitter; a demultiplexing means for demultiplexing the multiplexed signal received by the first receiving means into the first and second signals, employing the multiplexing control signal received by the second receiving means; and a time-base decompression means for time-base-decompressing the first signal obtained by the demultiplexing means.

Therefore, it is possible to realize a signal transmission system which transmits the first, second, and third signals through the same transmission line.

According to a sixth aspect of the present invention, there is provided a signal receiver which is connected to a signal transmitter via a transmission line, comprising: a receiving means for receiving a multiplexed signal in which a time-base-compressed first signal, a second signal and a third signal are multiplexed, from the signal transmitter; a detection means for detecting the second signal from the multiplexed signal; a multiplexing control signal generating means for generating a multiplexing control signal on the basis of the second signal detected by the detection means; a demultiplexing means for demultiplexing the multiplexed signal into the first, second and third signals, employing the multiplexing control signal; and a time-base decompression means for time-base-decompressing the first signal obtained by the demultiplexing means.

Therefore, it is possible to realize a signal transmission system which can demultiplex the multiplexed signal and receive the first, second and third signals through the same transmission line, without receiving the multiplexing control signal from the signal transmitter.

According to a seventh aspect of the present invention, in the signal receiver as defined in the fifth or sixth aspects, the first signal is an audio signal, the second signal is a horizontal synchronizing signal or a vertical synchronizing signal, and the third signal is a video signal.

Therefore, it is possible to realize a signal transmission system according to the DVI standard, which can transmit the audio signal as well as the video signal.

According to an eighth aspect of the present invention, there is provided a signal receiver according to DVI transmission standard which receives RGB video signals as serial data having: a first mode of receiving the RGB video signals as serial data and a second mode of receiving three signals corresponding to a luminance signal, a color difference signal and an audio signal, and comprising a switching means for switching between the first mode and the second mode.

Therefore, it is possible to realize a signal transmission system according to the DVI standard, which can transmit the audio signal as well as the video signal.

BEST MODE TO EXECUTE THE INVENTION

Hereinafter, embodiments of the present invention will be described with reference to the drawings. The embodiments described here are only illustrative and the present invention is not restricted to these embodiments.

Embodiment 1

Hereinafter, a signal transmission system according to a first embodiment will be described with reference to FIGS. 1 to 11.

Figure 1:
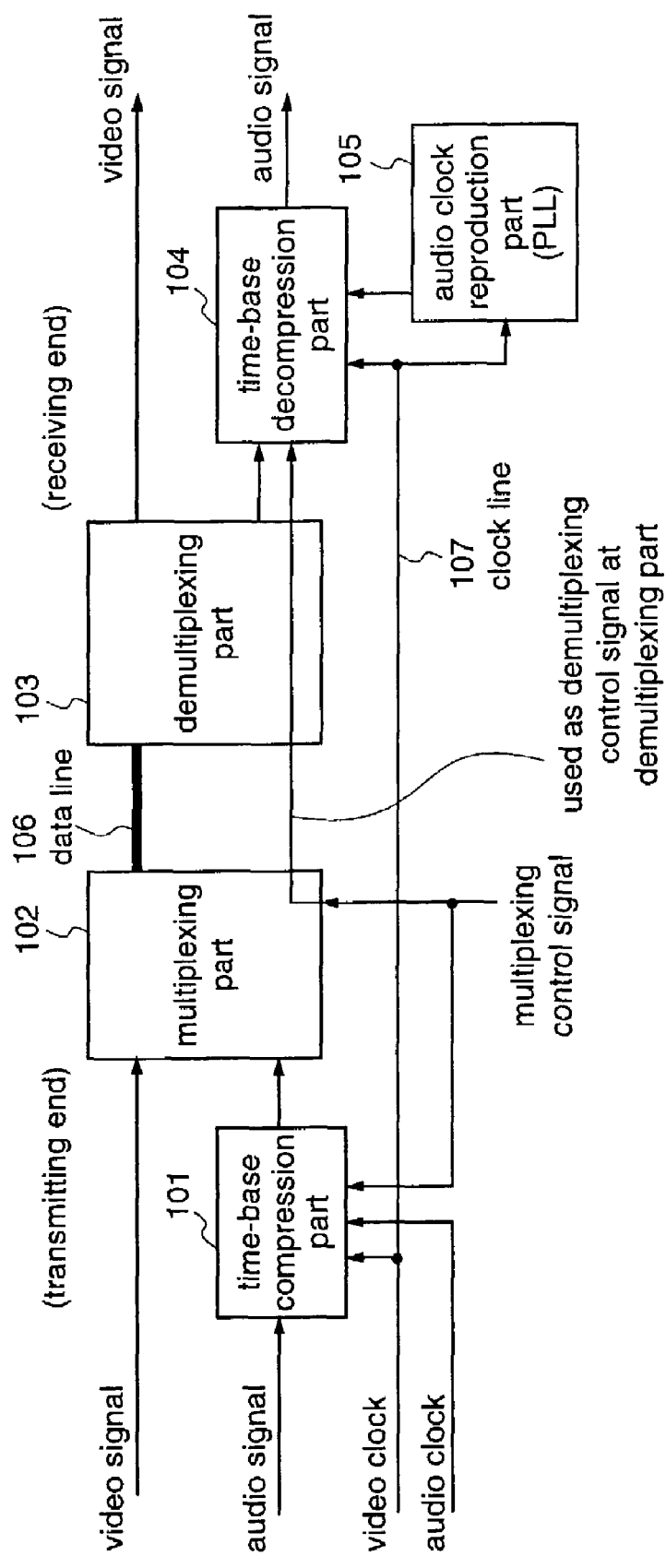
FIG. 1 is a diagram illustrating a structure of a signal transmission system according to a first embodiment of the present invention.

FIG. 1 is a diagram illustrating a structure of the signal transmission system according to the first embodiment.

In FIG. 1, a signal transmitter comprises a time-base compression part 101 which compresses an audio signal on a time axis, and a multiplexing part 102 which multiplexes a video signal and a time-base compressed audio signal employing a multiplexing control signal and outputs a video/audio multiplexed signal to a data line 106 (which will be described later).

A signal receiver comprises a demultiplexing part 103 which demultiplexes the video/audio multiplexed signal in which the video signal and the audio signal are multiplexed, which has been received through the data line 106, employing the multiplexing control signal, a time-base decompression part 104 which time-base decompresses the audio signal obtained by the demultiplexing part 103 to restore the original audio signal, and an audio clock reproduction part 105 which reproduces an audio clock on the basis of video clocks received from the transmitting end through a clock line 107.

The data line 106 is a serial transmission line connecting the signal transmitter and the signal receiver.

Here, the multiplexing control signal controls so as to multiplex the audio signal in a blank period of the video signal such as a horizontal synchronizing period and a vertical synchronizing period of the video signal, and the multiplexing control signal is generated by a multiplexing control signal generator (not shown).

Next, an operation of the signal transmission system according to the first embodiment will be described.

Figure 2:
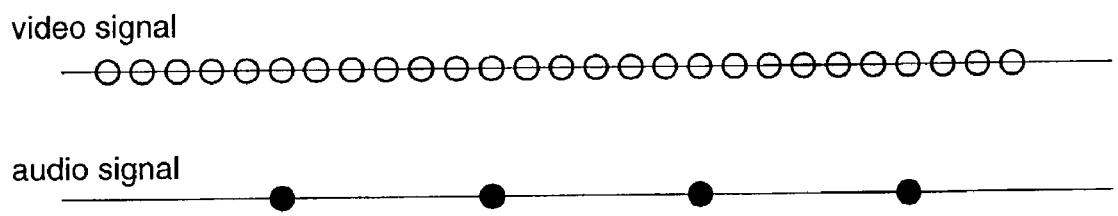
FIG. 2 is a diagram illustrating a relationship between a video signal and an audio signal before time-base compression.
Figure 3:
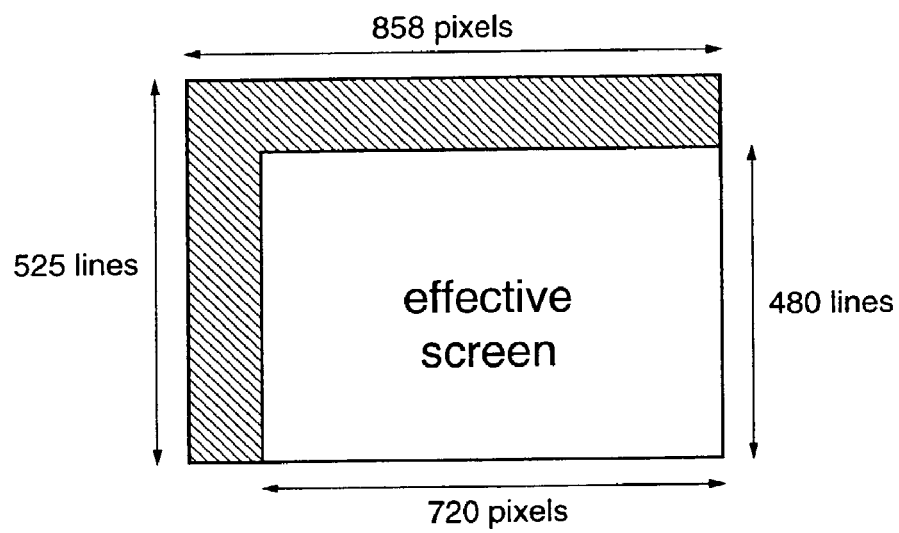
FIG. 3 is a diagram for explaining a horizontal synchronizing signal and a vertical synchronizing signal.

First, a relationship between the video signal and the audio signal before the time-base compression is schematically shown in FIG. 2. Since the video signal generally has a larger amount of data than the audio signal, several samples of the video signal temporally correspond to approximately one sample of the audio signal. In the signal transmission system according to the first embodiment, this audio signal is temporally compressed and multiplexed into an area where the video signal does not exist. More specifically, the time when the video signal does not exist is, for example, a horizontal synchronizing period or vertical synchronizing period of the video signal as shown in FIG. 3. In FIG. 3, a hatched section other than an effective screen corresponds to the synchronizing period. In FIG. 3, a SD screen of MP@ML (Main Profile Main Level) of MPEG 2 is taken as an example. The whole screen comprises 858 pixels (horizontal direction)×525 lines (vertical direction). Of the whole screen, the effective screen comprises 720 pixels (horizontal direction)×480 lines (vertical direction), and a difference between the whole screen and the effective screen is a synchronizing period. The audio signal is multiplexed in this synchronizing period.

Next, an operation at the transmitting end will be described.

Figure 4:
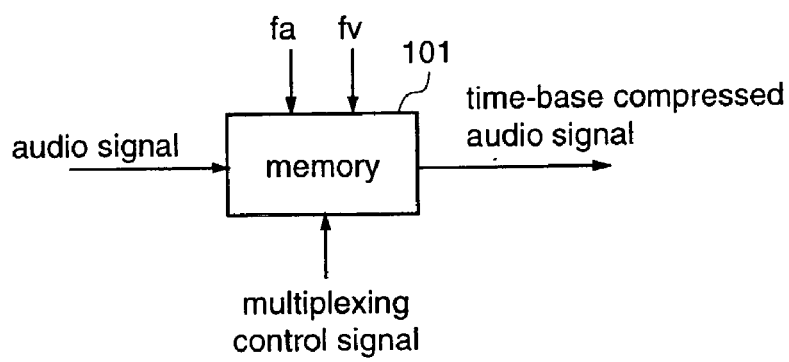
FIG. 4 is a diagram illustrating a structure of a time-base compression part of the signal transmission system according to the first embodiment.

FIG. 4 is a diagram illustrating a structure of the time-base compression part 101. The time-base compression part 101 is constituted mainly by a memory, and converts a rate of an inputted audio signal. More specifically, a sampling clock of the input is an audio clock fa and a clock of the output is a video clock fv. Here, fa refers to an audio sampling clock frequency and fv refers to a video sampling clock frequency. Further, the multiplexing control signal is employed to control the output of the time-base compression part 101. As this multiplexing control signal, the horizontal synchronizing signal or the vertical synchronizing signal is employed.

Figure 5:
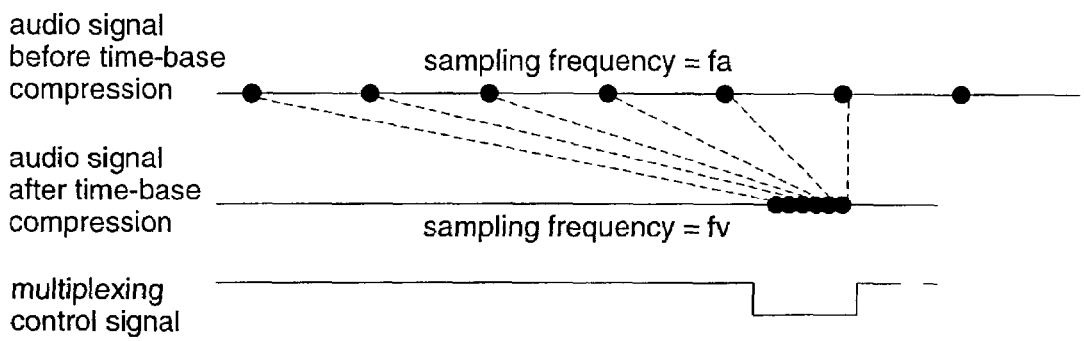
FIG. 5 is a diagram for explaining time-base compression in the signal transmission system according to the first embodiment.

FIG. 5 is a diagram illustrating a state of time-base compression by the time-base compression part 101. The audio signal before time-base compression is inputted at the sampling frequency fa and the audio signal after the time-base compression is outputted to the multiplexing part 102 at the sampling frequency fv. The audio signal after the time-base compression is outputted in a period during which the multiplexing control signal is LOW. In this figure, for simplification, a reduced number of audio sample points which are outputted in a period during which the multiplexing control signal is LOW are shown, while the actually outputted audio sample points are far more than these.

Figure 6:
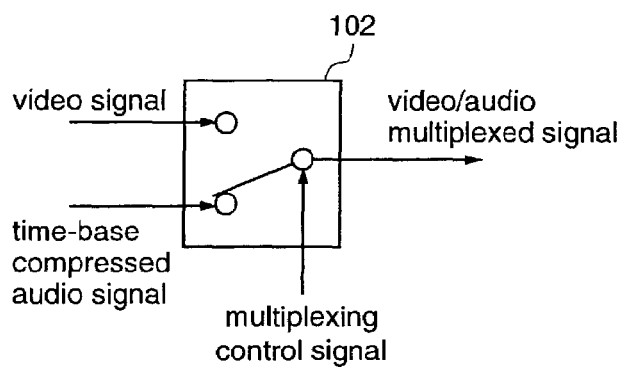
FIG. 6 is a diagram illustrating a structure of a multiplexing part of the signal transmission system according to the first embodiment.

FIG. 6 is a diagram illustrating a structure of the multiplexing part 102. The multiplexing part 102 multiplexes the video signal and the time-base-compressed audio signal, and outputs a video/audio multiplexed signal. Inputs of the video signal and the time-base-compressed audio signal to the multiplexing part 102 are switched in accordance with the multiplexing control signal. For this multiplexing control signal, the horizontal synchronizing signal or vertical synchronizing signal of the video is employed.

Figure 7:
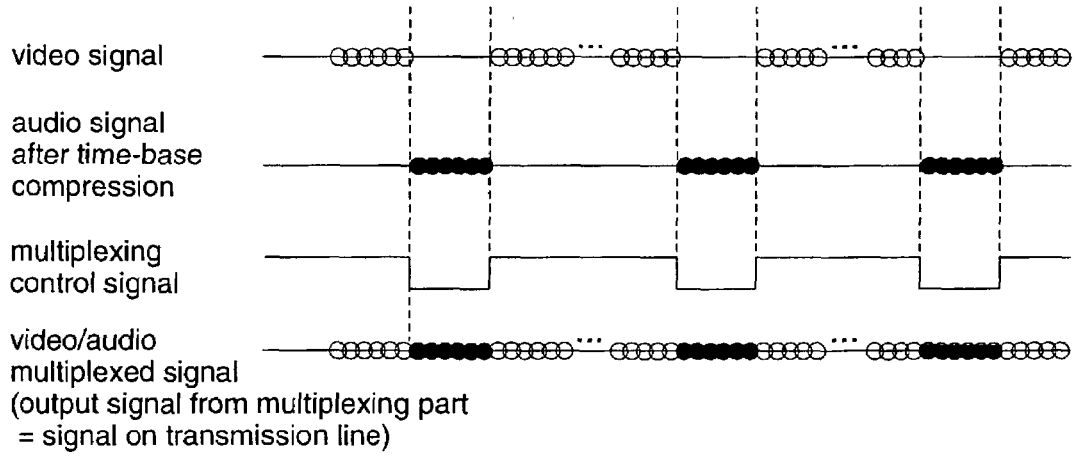
FIG. 7 is a diagram illustrating a state of multiplexing of a video signal and an audio signal in the signal transmission system according to the first embodiment.

FIG. 7 illustrates a state of multiplexing of a video signal and an audio signal by the multiplexing part 102. In this figure, upper two lines indicate a video signal and an audio signal after time-base compression. A white circle indicates a sampling point of the video signal and a black circle indicates a sampling point of the audio signal. The lowest line indicates a state where the audio signal is multiplexed onto the video signal in a period during which the multiplexing control signal is LOW. This video/audio multiplexed signal is a signal for a transmission line, and is outputted to the transmission line.

Next, an operation at the receiving end will be described.

Figure 8:
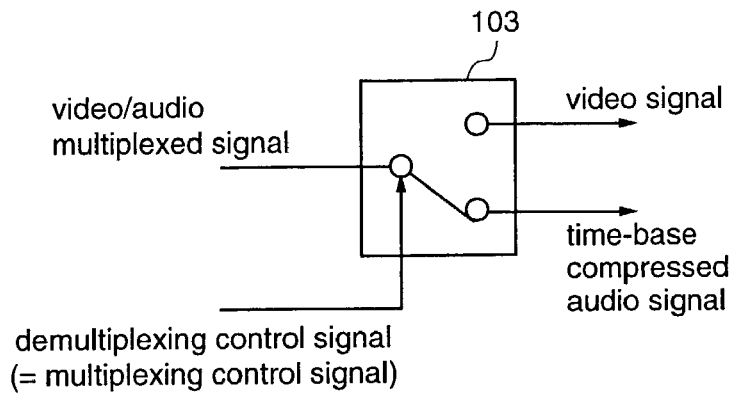
FIG. 8 is a diagram illustrating a structure of a demultiplexing part of the signal transmission system according to the first embodiment.

FIG. 8 is a diagram illustrating a structure of the demultiplexing part 103. The demultiplexing part 103 demultiplexes the video/audio multiplexed signal that has been transmitted through the data line 106 into a video signal and a time-base compressed audio signal. While a demultiplexing control signal is employed for the demultiplexing, the multiplexing control signal which is supplied from the transmitting end through a transmission line provided apart from the data line 106 is employed as this demultiplexing control signal.

Figure 9:
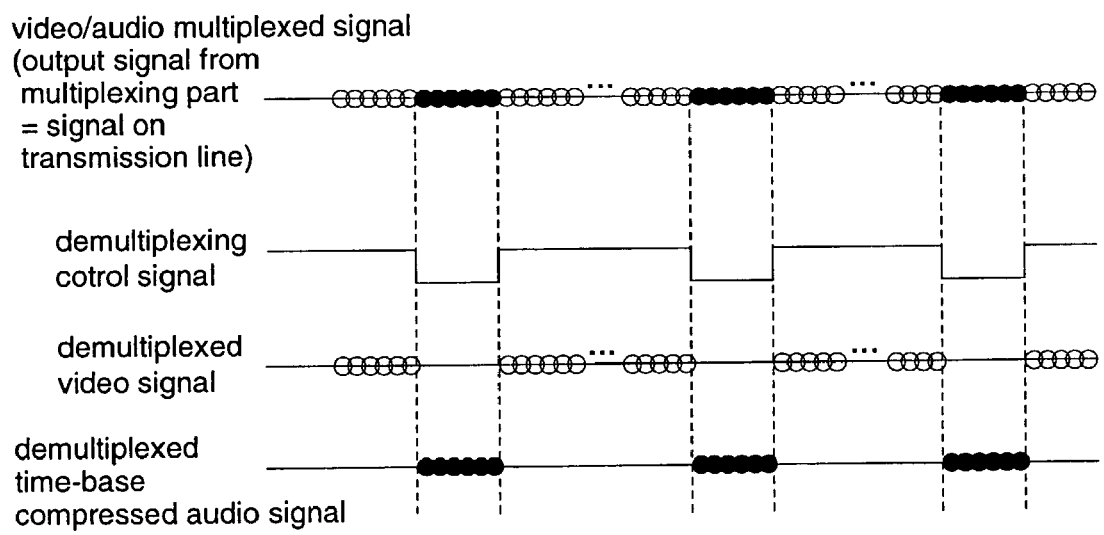
FIG. 9 is a diagram illustrating a state of demultiplexing into the video signal and the audio signal in the signal transmission system according to the first embodiment.

FIG. 9 is a diagram illustrating a state of the demultiplexing of the video signal and the audio signal by the demultiplexing part 103. The video/audio multiplexed signal transmitted through the data line 106 is demultiplexed into a video signal and an audio signal in accordance with the demultiplexing control signal. More specifically, a signal during a period in which the demultiplexing control signal is LOW is taken as the time-base-compressed audio signal, and a selector of the demultiplexing part 103 shown in FIG. 8 is set toward the side of the audio signal output.

Figure 10:
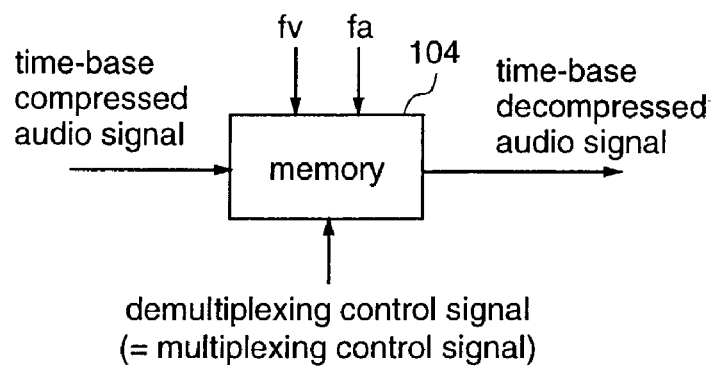
FIG. 10 is a diagram illustrating a structure of a time-base decompression part of the signal transmission system according to the first embodiment.

FIG. 10 is a diagram illustrating a structure of the time-base decompression part 104. The time-base decompression part 104 is constituted mainly by a memory, and it receives the time-base-compressed audio signal at the video sampling clock fv in a period during which the demultiplexing control signal is LOW and outputs the audio signal at the audio sampling clock frequency fa. Thereby, an audio signal which has been time-base-decompressed as before can be obtained.

Figure 11:
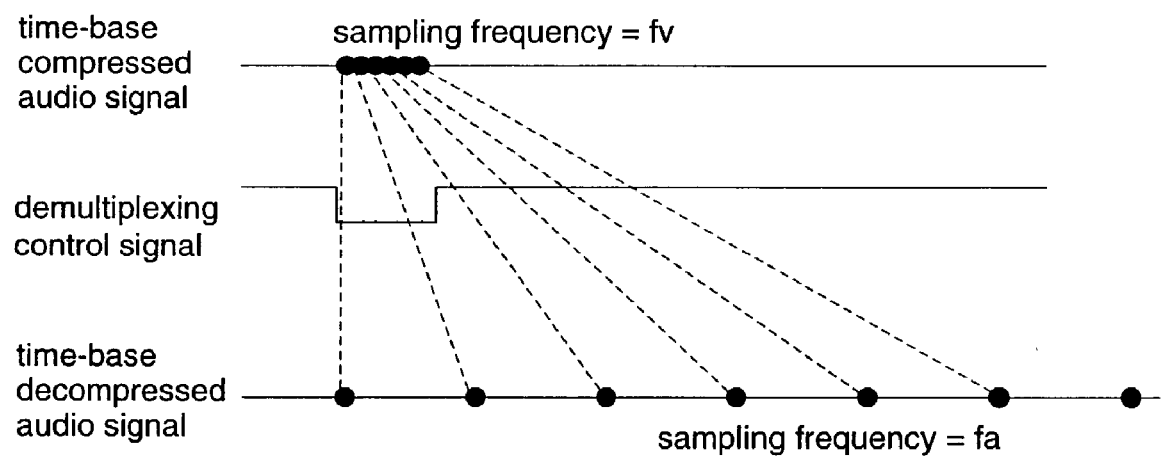
FIG. 11 is a diagram for explaining time-base decompression in the signal transmission system according to the first embodiment.

FIG. 11 is a diagram illustrating a state of time-base decompression by the time-base decompression part 104. Data during a period in which the demultiplexing control signal is LOW is taken as an audio signal, and the time-base-compressed audio signal is inputted at the sampling frequency fv only for the period in which the demultiplexing control signal is LOW and this signal is outputted at the sampling frequency fa, thereby obtaining the time-base-decompressed audio signal.

Next, an operation of the audio clock reproduction part 105 will be described. At the receiving end, on the basis of the video clock that has been transmitted from the transmitting end, a PLL (Phase Lock Loop) control is performed to reproduce the audio clock, and the audio clock is supplied to the time-base decompression part 104.

As described above, in the signal transmission system according to the first embodiment of the present invention, the multiplexing part 102 at the transmitting end multiplexes the video signal and the time-base compressed audio signal on the basis of the multiplexing control signal, whereby the video signal and the audio signal can be transmitted through the same data line 106. Further, at the receiving end, the video/audio multiplexed signal which has been received through the data line 106 can be demultiplexed into the video signal and the audio signal in accordance with the demultiplexing control signal.

Further, the horizontal synchronizing period or vertical synchronizing period of the video signal is employed as the multiplexing control signal and the demultiplexing control signal, and the audio signal is time-base-compressed at the transmitting end and time-base-decompressed at the receiving end, whereby the audio signal can be multiplexed in blanks of the video signal and separated therefrom.

Embodiment 2

Hereinafter, a signal transmission system according to a second embodiment will be described with reference to FIGS. 12 to 19.

Figure 12:
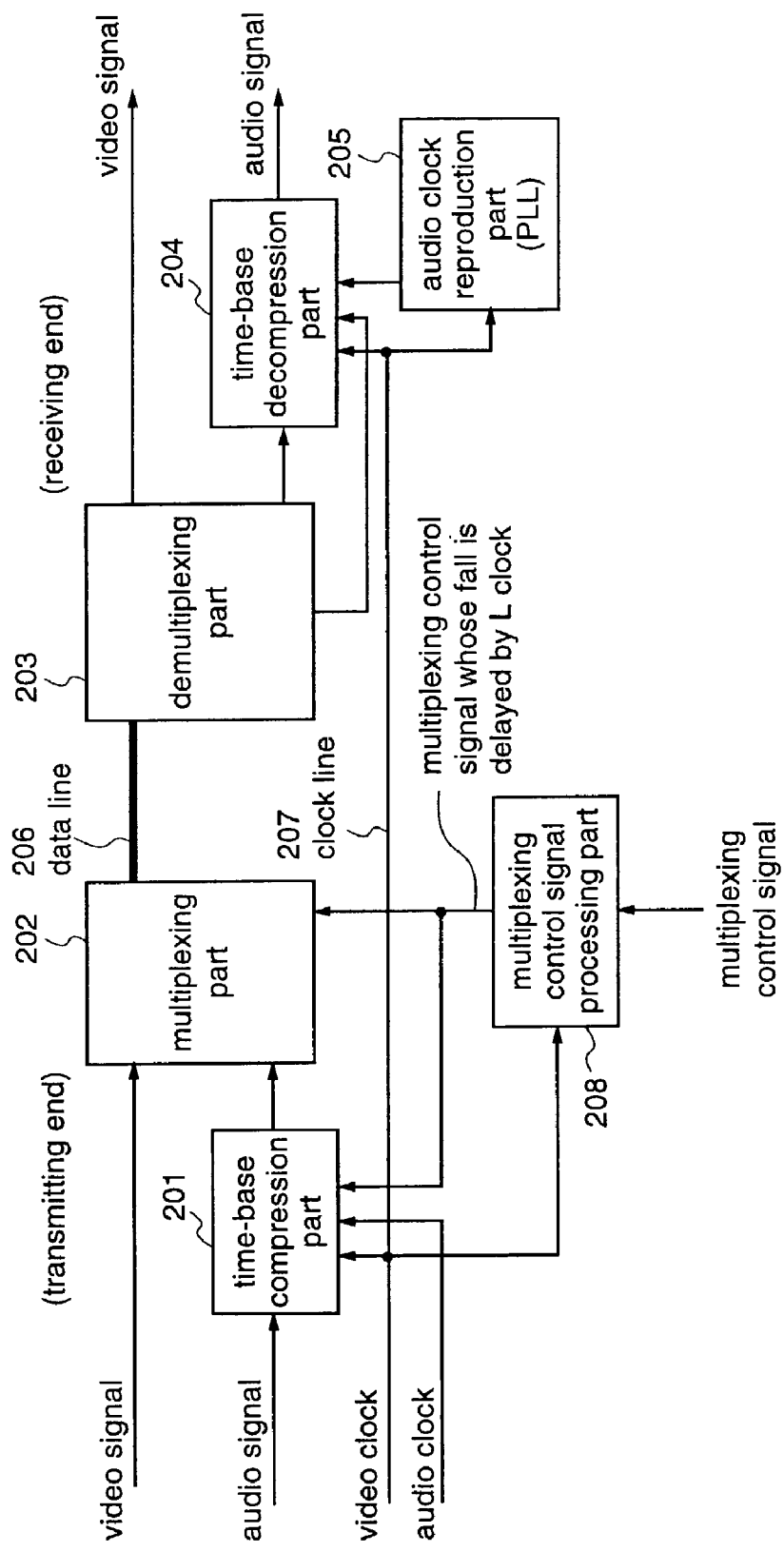
FIG. 12 is a diagram illustrating a structure of a signal transmission system according to a second embodiment.

FIG. 12 is a diagram illustrating a structure of the signal transmission system according to the second embodiment.

In FIG. 12, a signal transmitter comprises a time-base compression part 201 which time-base-compresses an audio signal, a multiplexing part 202 which multiplexes a video signal and the audio signal employing a multiplexing control signal and outputs a video/audio multiplexed signal, and a multiplexing control signal processing part 208 which processes the multiplexing control signal.

A signal receiver comprises a demultiplexing part 203 which demultiplexes the video/audio multiplexed signal received through a data line 206, a time-base decompression part 204 which time-base-decompresses the audio signal obtained by the demultiplexing part 203, and an audio clock reproduction part 205 which reproduces an audio clock from a video clock received from the transmitting end through a clock line 207.

The data line 206 is a transmission line connecting the signal transmitter and the signal receiver.

The signal transmission system according to the second embodiment differs from the signal transmission system of the first embodiment in that the multiplexing control signal is not given to the receiving end in the signal transmission system according to the second embodiment.

Hereinafter, an operation of the signal transmission system according to the second embodiment will be described. The time-base compression part 201 time-base-compresses the audio signal like in the first embodiment, while the multiplexing control signal for the time-base compression is different from that in the first embodiment.

Figure 13:
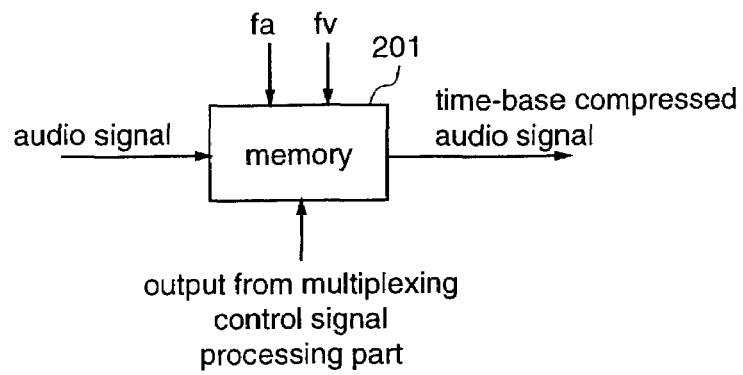
FIG. 13 is a diagram illustrating a structure of a time-base compression part of the signal transmission system according to the second embodiment.

FIG. 13 is a diagram illustrating a structure of the time-base compression part 201. The time-base compression part 201 is constituted by a memory like the time-base compression part 101 of the first embodiment, and converts a sampling rate of the audio signal. In the first embodiment, as the control signal for this memory, the multiplexing control signal, i.e., the horizontal synchronizing signal or the vertical synchronizing signal is used as it is, while in this second embodiment this multiplexing control signal is somewhat processed to be employed. More specifically, a signal which falls after counting a video sampling clock during an L-clock period (L×1/fv sec.) since falling of the multiplexing control signal (horizontal synchronizing signal or vertical synchronizing signal) is employed. The object of this processing is to provide a no-signal period (L-clock period) before the audio signal after the time-base compression, and make this no-signal period recognized at the receiving end as a switching timing between the video signal and the audio signal.

Figure 14:
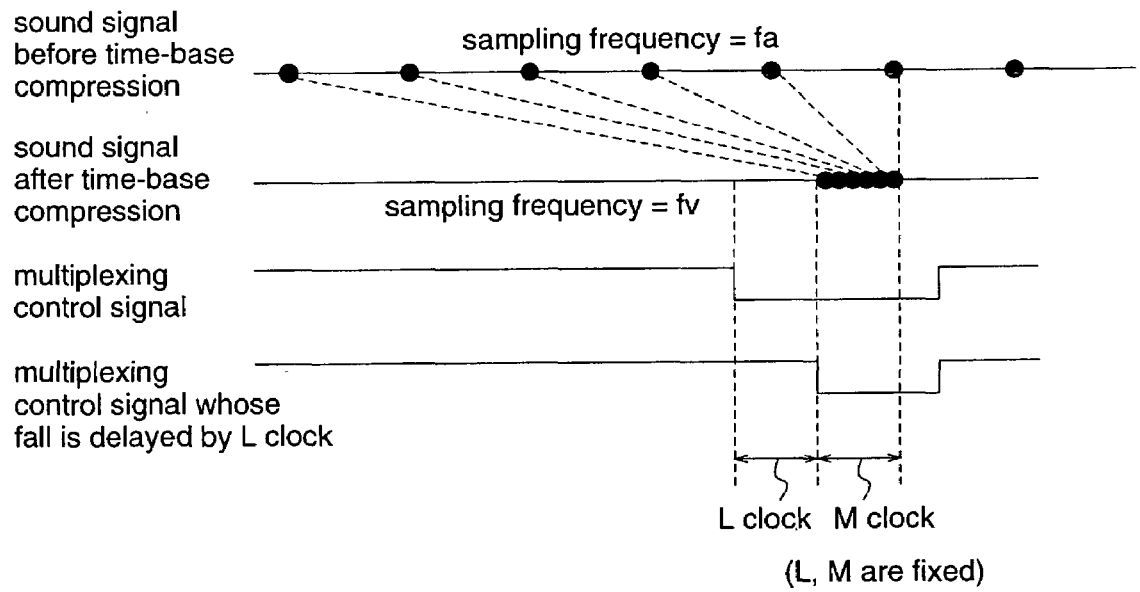
FIG. 14 is a diagram for explaining time-base compression in the signal transmission system according to the second embodiment.

FIG. 14 is a diagram illustrating a state of time-base compression by the time-base compression part 201. In this figure, the relationship between the audio signal before the time-base compression and the audio signal after the time-base compression is almost the same as that in the first embodiment, while the audio signal after the time-base compression is delayed from the falling of the multiplexing control signal by L clocks. This L-clock period is in a no-signal state.

Figure 15:
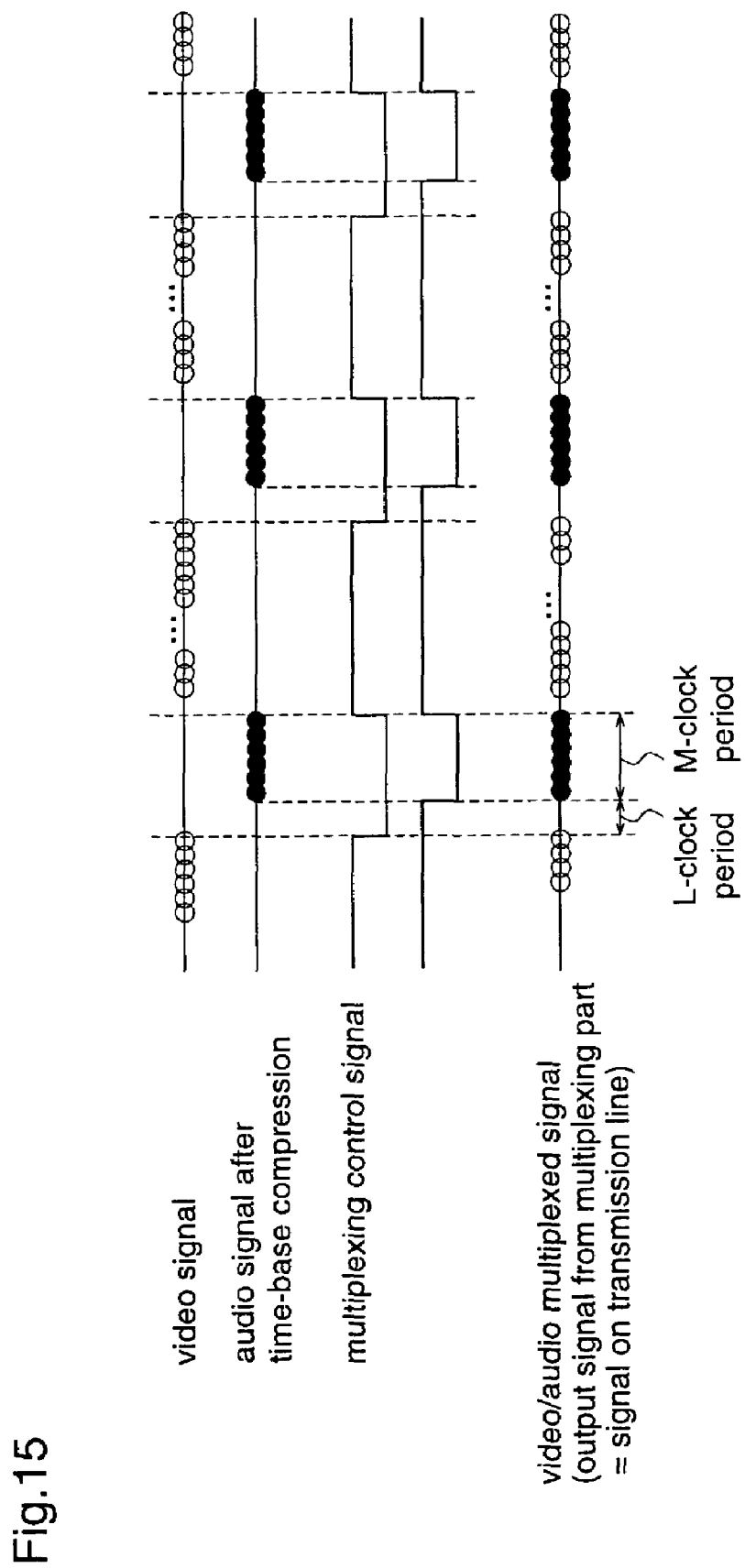
FIG. 15 is a diagram illustrating a state of multiplexing of a video signal and an audio signal in the signal transmission system according to the second embodiment.

FIG. 15 is a diagram illustrating a state of multiplexing of the video signal and the audio signal in the second embodiment. As shown in FIG. 14, an L-clock no-signal period is provided between the video signal and the time-base-compressed audio signal. In this second embodiment, samples of the time-base-compressed audio signal that is to be multiplexed with the video signal are defined as a video sampling clock of a M-clock period (M×1/fv sec.). These L and M are integers having fixed values. The multiplexing control signal processing part 208 generates a new multiplexing control signal which is obtained by delaying the fall of the multiplexing control signal (horizontal synchronizing period or vertical synchronizing period) by L clocks. Accordingly, the positions and the number of sampling points of the audio signal can be recognized at the receiving end, thereby separating the audio signal.

Figure 16:
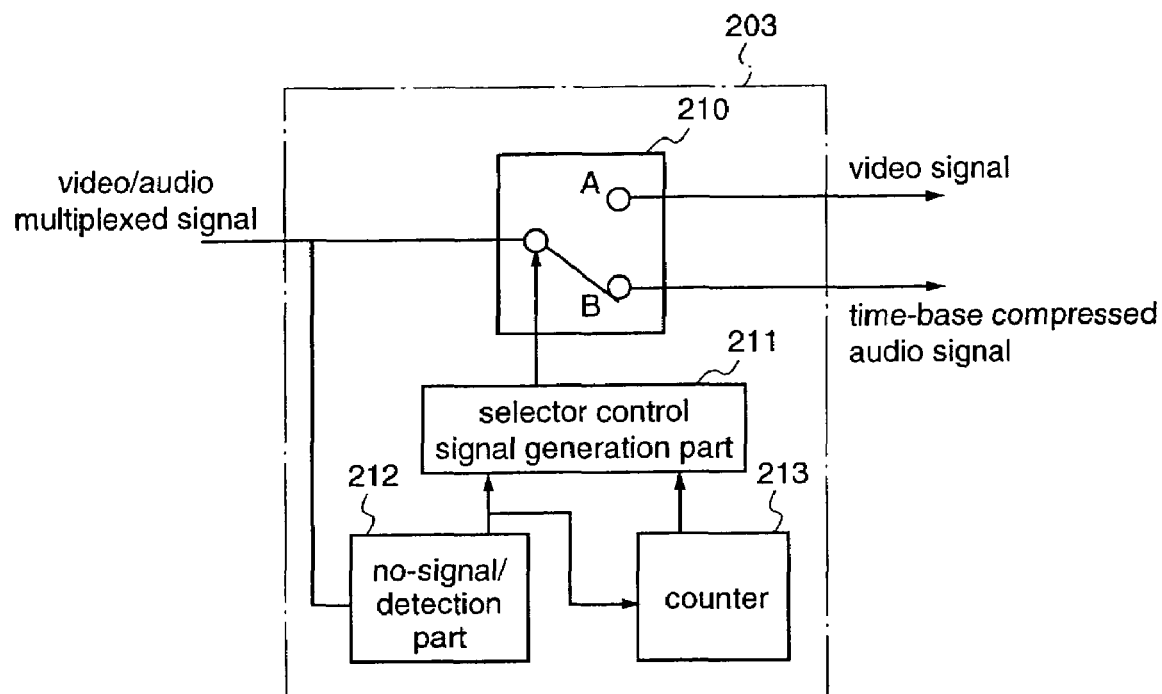
FIG. 16 is a diagram illustrating a structure of a demultiplexing part of the signal transmission system according to the second embodiment.

FIG. 16 is a diagram illustrating a structure of the demultiplexing part 203. In this figure, numeral 210 denotes a selector circuit which demultiplexes the multiplexed signal into the video signal and the time-base-compressed audio signal. Numeral 211 denotes a selector control signal generation part which generates a signal for controlling the selector circuit 210. Numeral 212 denotes a no-signal detection part which detects a no-signal state of the video/audio multiplexed signal transmitted through the transmission line. A counter 213 counts a period during which samples of the audio signal exist, i.e., an M-clock period (M×1/fv sec.).

Next, a specific operation of the demultiplexing part 203 will be described. When detecting a no-signal state of the L-clock period (L×1/fv sec.), the no-signal detection part 212 changes its output level from HIGH to LOW. A timing of the start of counting by the counter 213 (falling of the output) is the same as a timing of the falling of the output from the no-signal detection part 212. When counting the M-clock period since the fall of the output from the no-signal detection part 212, the counter 213 raises its output from LOW to HIGH. The selector control signal generation part 211 is a circuit for calculating an OR (logical add) of the output from the no-signal detection part 212 and the output from the counter 213. The selector circuit 210 selects A to extract the video signal in a period during which the output from the selector control signal generation part 211 is HIGH, while selecting B to extract the time-base-compressed audio signal in a period during which the output from the selector control signal generation part 211 is LOW.

Figure 17:
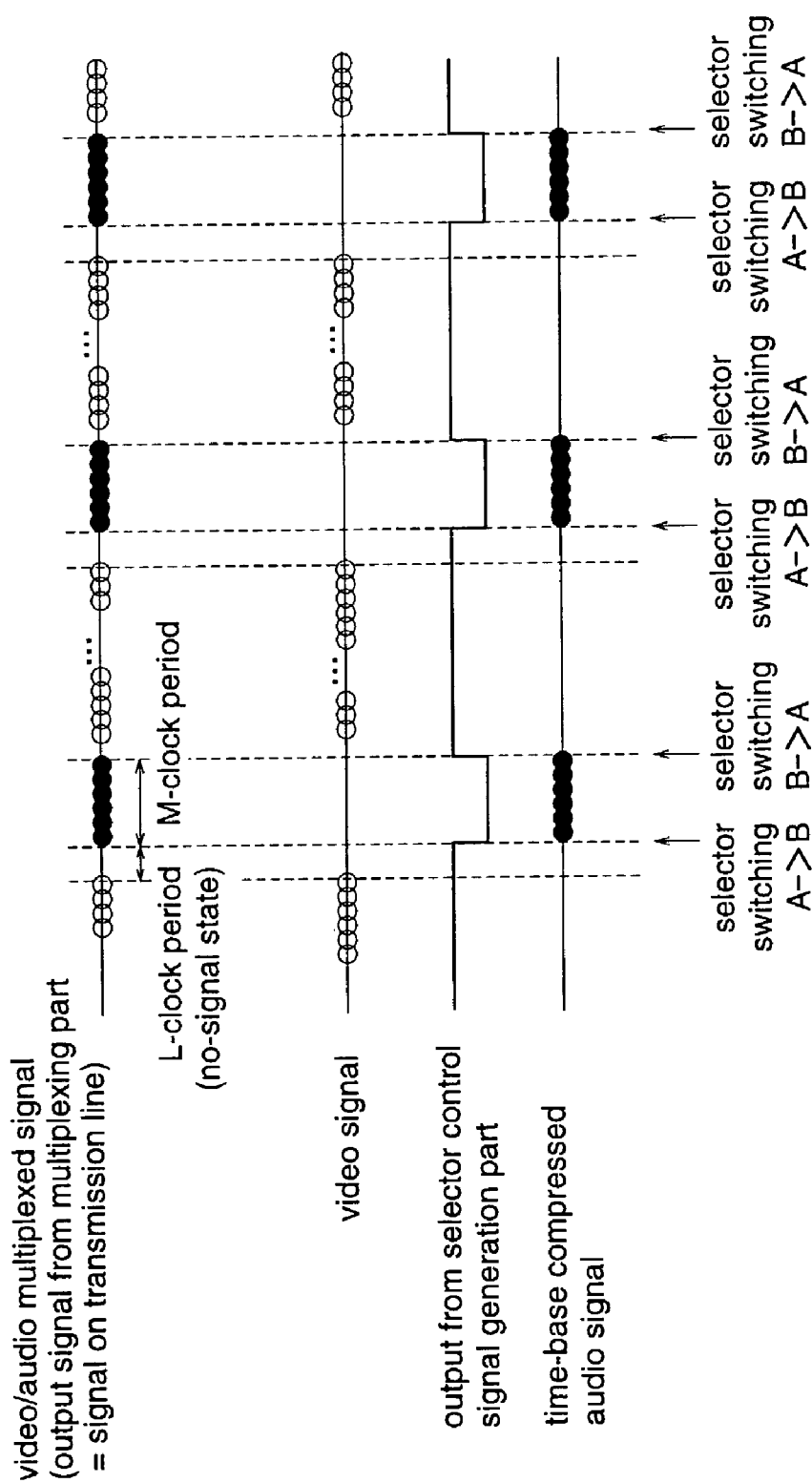
FIG. 17 is a diagram illustrating a state of demultiplexing into the video signal and the audio signal in the signal transmission system according to the second embodiment.

FIG. 17 illustrates a state of demultiplexing of the video signal and the audio signal in the second embodiment. In the video/audio multiplexed signal on the transmission line, the no-signal state continues for the L-clock period, and thereafter the audio signal samples exist for the M-clock period.

As shown in FIG. 16, the selector is switched to select B in the period during which the selector control signal is LOW and set at A in other cases, whereby the video signal and the audio signal can be separated and extracted from the video/audio multiplexed signal.

Figure 18:
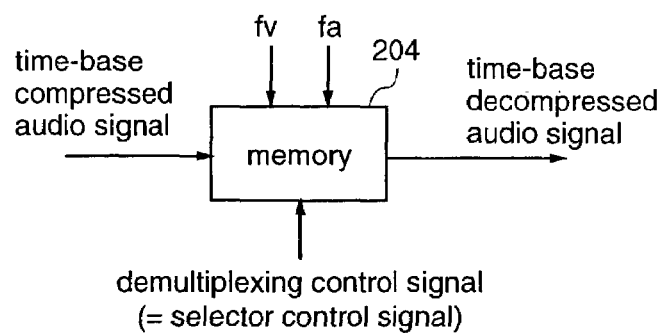
FIG. 18 is a diagram illustrating a structure of a time-base decompression part of the signal transmission system according to the second embodiment.

FIG. 18 is a diagram illustrating a structure of the time-base decompression part 204. The time-base decompression part 204 is constituted by a memory, like the time-base decompression part 104 in the first embodiment, while the selector control signal shown in FIG. 16 is employed as the demultiplexing control signal.

Figure 19:
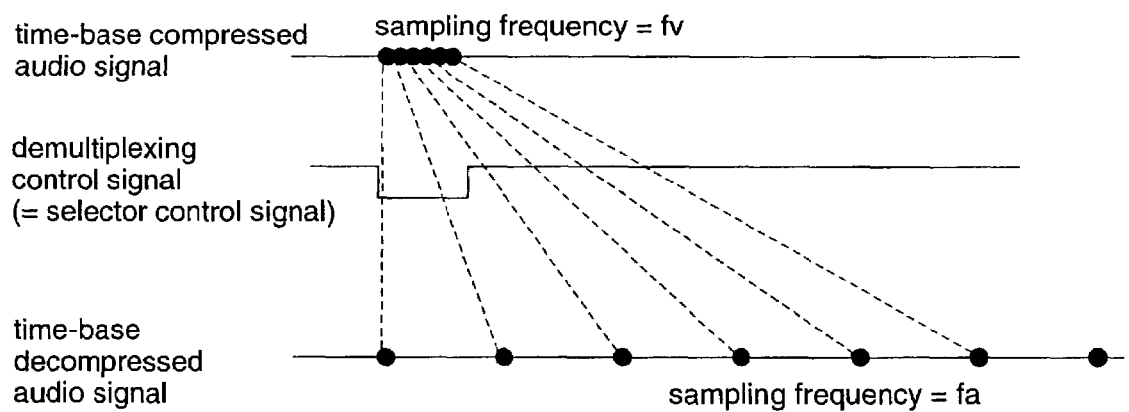
FIG. 19 is a diagram for explaining time-base decompression in the signal transmission system according to the second embodiment.

FIG. 19 is a diagram illustrating a state of time-base decompression by the time-base decompression part 204. The time-base-compressed audio signal is inputted to the time-base decompression part 204 at the sampling frequency fv only in a period during which the demultiplexing control signal, that is, the selector control signal is LOW, and the inputted signal is outputted at the audio sampling clock fa, thereby obtaining the time-base-decompressed audio signal.

As described above, the signal transmission system according to the second embodiment can realize the same effect as that of the signal transmission system according to the first embodiment, without transmitting the multiplexing control signal to the receiving end. That is, in this second embodiment, the no-signal state in the L-clock period is provided between the video signal and the audio signal in the period during which the video signal and the audio signal are multiplexed, and the sample points of the audio signal are kept constant as the M-clock period, and the receiving end detects the L-clock period of the no-signal state and thereafter takes the M-clock period as a timing of separating the audio signal. Accordingly, the audio signal and the video signal can be separated, without transmitting the multiplexing control signal to the receiving end.

Embodiment 3

Hereinafter, a signal transmission system according to a third embodiment will be described with reference to FIGS. 20 to 23. In the third embodiment, the signal transmission system according to the first or second embodiment is applied to the DVI (Digital Visual Interface) standard.

Figure 20:
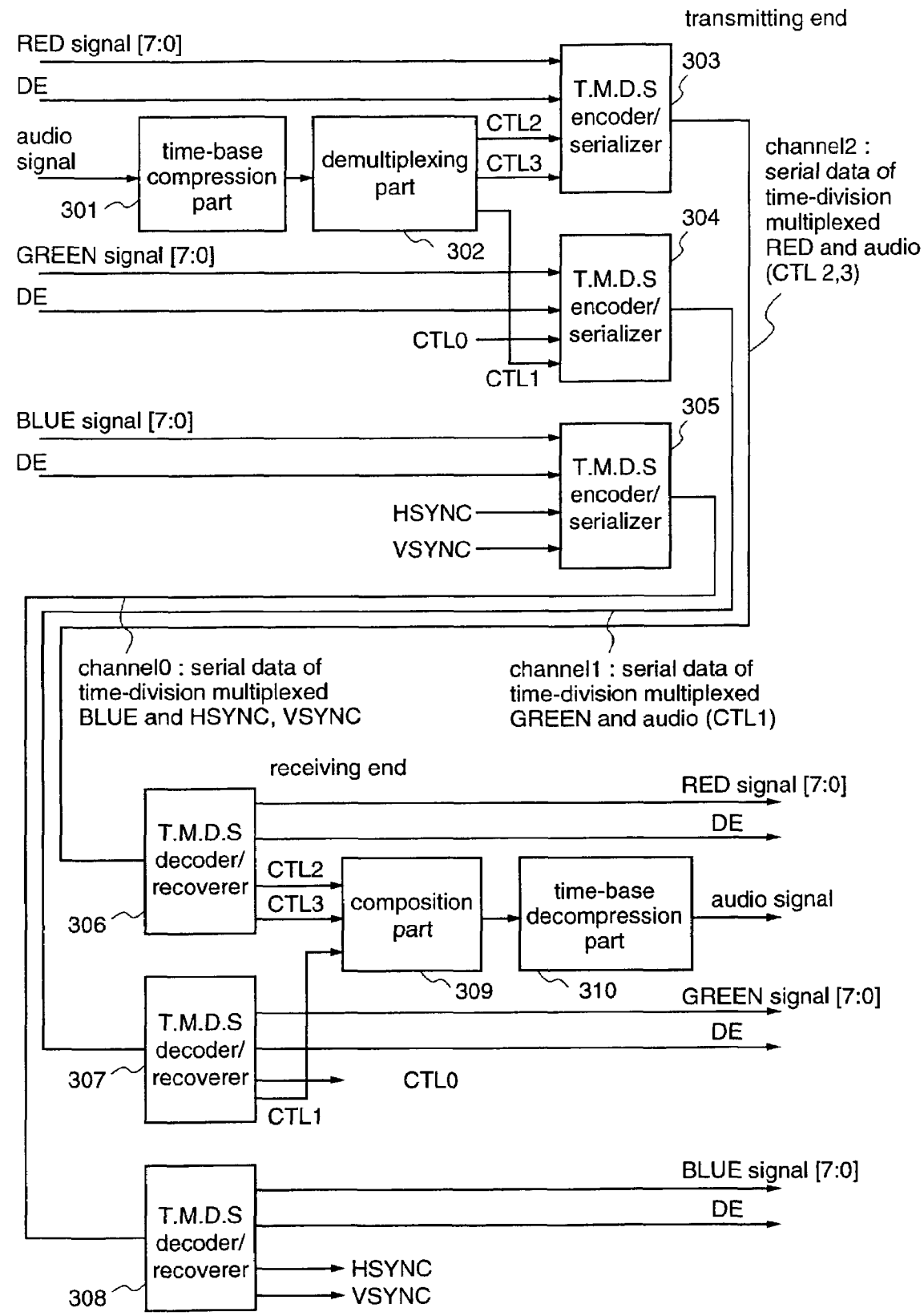
FIG. 20 is a diagram illustrating a structure of a signal transmission system according to a third embodiment.

FIG. 20 is a diagram illustrating a structure of the signal transmission system according to the third embodiment.

In FIG. 20, numeral 301 denotes a time-base compression part, which is the same as that employed in the first or second embodiment. Numeral 302 denotes a demultiplexing part, which demultiplexes a time-base-compressed audio signal into signals CTL 2, CTL 3 and CTL 1 according to the DVI standard, to be superimposed. Numerals 303 to 305 denote TMDS encoders/serializers and numerals 306 to 308 denote TMDS decoders/recoveres, which are the same as those in the prior art. Numeral 309 denotes a composition part which composes the audio signals obtained from the signals CTL 1, 2, and 3. Numeral 310 denotes a time-base decompression part which decompresses the time-base-compressed audio signal that is outputted from the composition part 309. In this figure, serial data of time-division-multiplexed BLUE and HSYNC or VSYNC (horizontal synchronizing period or vertical synchronizing period) of a video signal are transmitted through channel 0 of a transmission line, serial data of time-division-multiplexed GREEN and audio (CTL 1) is transmitted through channel 1, and serial data of time-division-multiplexed RED and audio (CTL 2, 3) is transmitted through channel 2.

An operation of the so-configured signal transmission system will be described.

Figure 21:
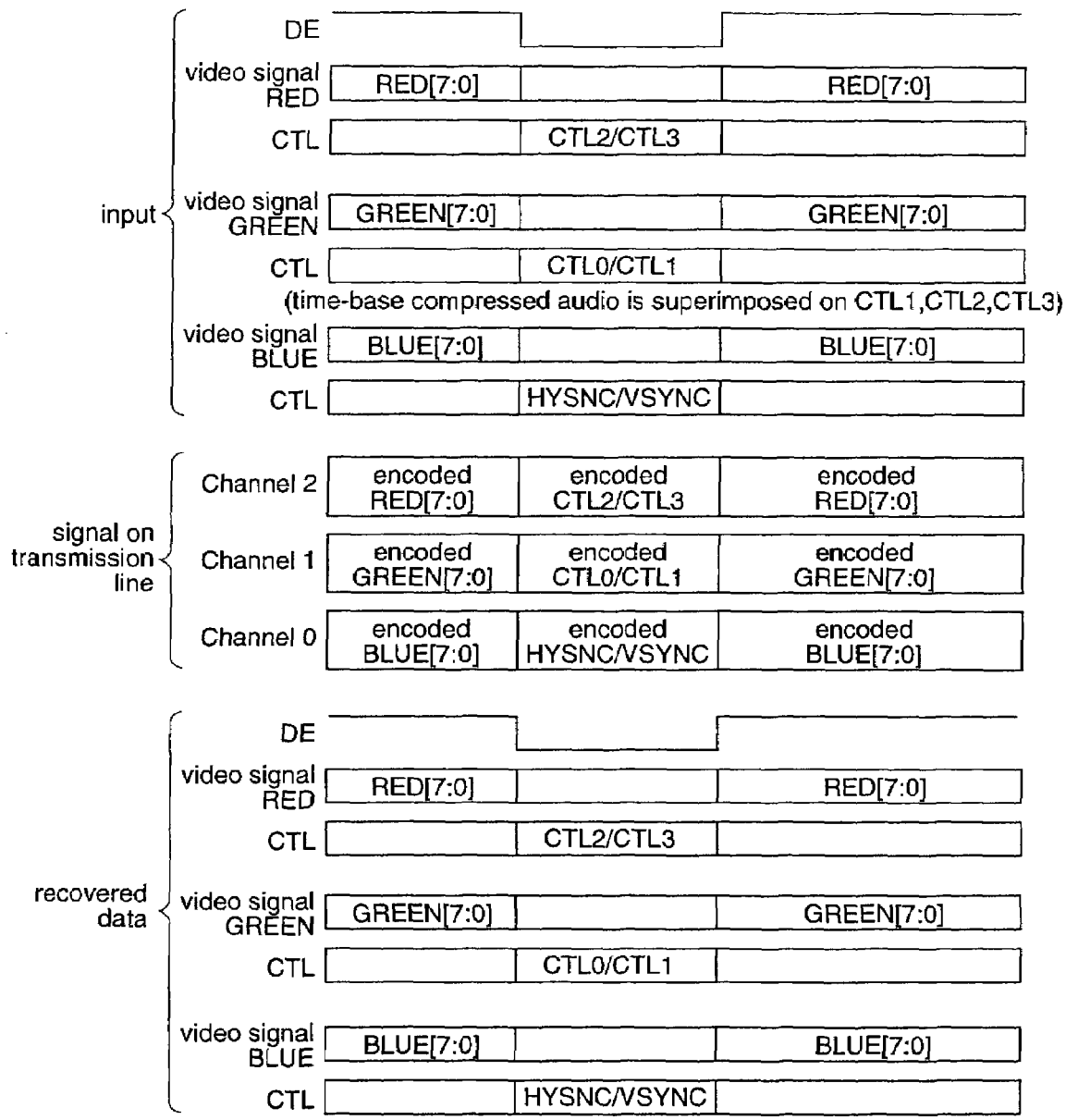
FIG. 21 is a diagram illustrating a state of data in the signal transmission system according to the third embodiment.

FIG. 21 illustrates states of signals on the transmission lines according to the third embodiment.

First, input data to the TMDS encoders are shown on the top. CTLs (Control Signals) are inserted when a DE (data enable) signal is LOW, and the time-base-compressed audio signals are superimposed on these CTLs 1, 2 and 3, thereby TMDS-encoding the signals. As signals on the transmission lines, the encoded CTLs 2 and 3 are superposed in channel 2, and the encoded CTL 1 is superposed in channel 1. Thus, on the transmission line, audio (audio signal) is superposed in the period of the horizontal synchronizing signal or the vertical synchronizing signal. Data which are TMDS-decoded and recovered at the receiving end are shown at the bottom. These recovered data are identical to the input data at the transmitting end.

Next, a method for separating audio at the receiving end will be described.

Figure 22:
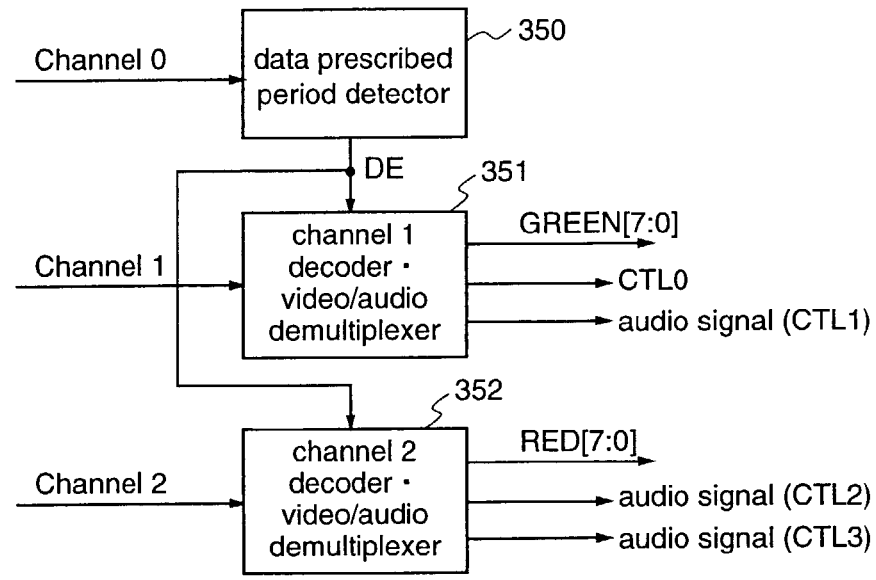
FIG. 22 is a diagram illustrating an audio separation method at the receiving end in the signal transmission system according to the third embodiment.

As shown in FIG. 22, a prescribed period of the data in channel 0 is initially detected by a data prescribed period detection circuit 350. This prescribed period of the data is a horizontal synchronizing period or a vertical synchronizing period. This prescribed period of the data is detected to generate a DE (Data Enable) signal, a period during which the DE signal is LOW is taken as a period during which the audio signal is multiplexed, the DE signal is supplied to the decoding and video/audio demultiplexing circuits 351 and 352 for channels 1 and 2, and the video signal and the audio signal are separated by channel 1 and 2 decoders. Then, the audio signals of the separated lines (CTL 1, CTL 2, and CTL 3) are obtained.

Next, a decoding method at the receiving end will be described.

Figure 23:
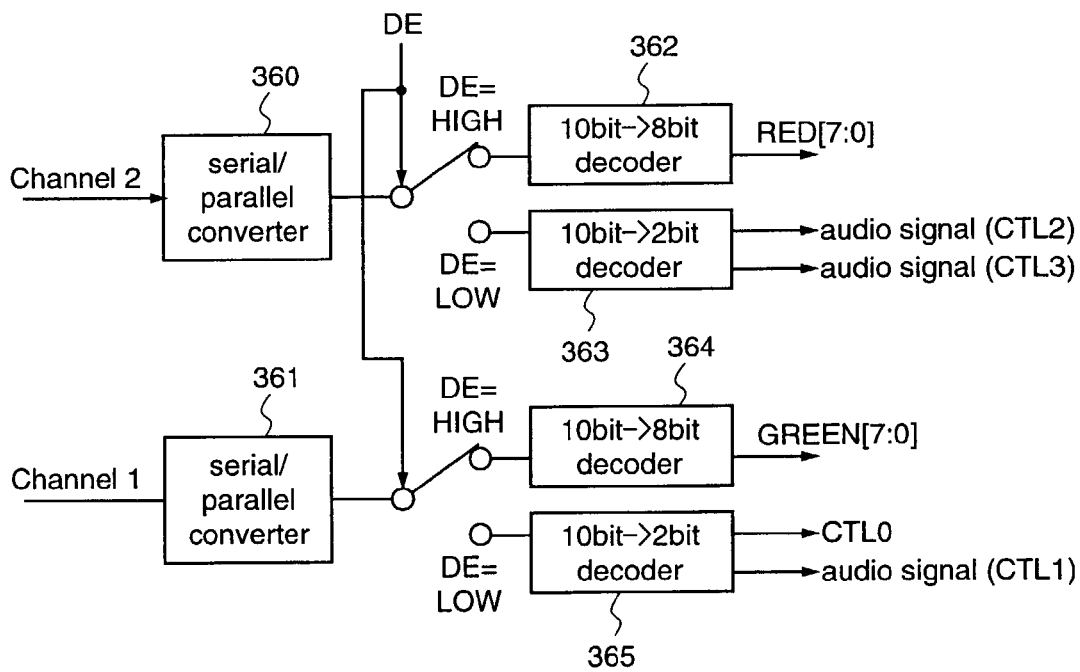
FIG. 23 is a diagram illustrating a decoding method at the receiving end in the signal transmission system according to the third embodiment.

In FIG. 23, the video/audio multiplexed signal that has been transmitted through channel 2 is subjected to serial/parallel conversion by a serial/parallel conversion circuit 360, this signal is taken as a video signal during the period in which the DE (Data Enable) signal is HIGH, and the video signal is subjected to 10 bit/8 bit TMDS decoding by a decoder 362, thereby obtaining a RED signal. On the other hand, this signal is taken as an audio signal during the period in which the DE (Data Enable) signal is LOW, and the audio signal is subjected to 10 bit/2 bit TMDS decoding by a decoder 363, thereby obtaining audio signals in the lines of CTL 2 and CTL 3. Similarly in channel 1, the transmitted video/audio multiplexed signal is subjected to serial/parallel conversion by a serial/parallel conversion circuit 361, this signal is taken as a GREEN video signal during the period in which the DE (Data Enable) signal is HIGH, and the video signal is subjected to 10 bit/8 bit TMDS decoding by a decoder 364. On the other hand, during the period in which the DE (Data Enable) signal is LOW, this signal is subjected to 10 bit/2 bit TMDS decoding by a decoder 365, thereby obtaining the audio signal for the CTL 1.

In this way, the audio signals which are obtained on the CTL (Control) lines are composed by the composition part 309 and further subjected to rate conversion by the time-base decompression part 310, thereby obtaining the original audio signal.

Next, operations of the demultiplexing part 302 and the composition part 309 will be described.

In the demultiplexing part 302, the time-base-compressed audio signal is demultiplexed into the three lines of CTL 2, 3 and 1, while only a line of CTL 2 or two lines of CTL 2 and 3 may be used depending on the band of the audio signal. In addition, the audio signal may be separated in the order of CTL 2, 3, 1, 2, 3 and 1, according to the order of sampling points of the audio signal. In the composition part 309, the decoded audio signals transmitted through the transmission lines are considered that the audio signals are transmitted in the order of CTL 2, 3 and 1, thereby to compose the audio signals. These three lines can be used not only in this order of CTL 2, 3 and 1 but also in an arbitrary order, while the order of demultiplexing and composition should be decided at the transmitting end and the receiving end.

As described above, in the signal transmission system according to the third embodiment, the structure of the signal transmission system according to the first or second embodiment is applied for the DVI standard. The time-base-compressed audio signal is demultiplexed into the lines of CTL 2, 3 and 1, and at the receiving end, the audio signals transmitted by the CTL 2, 3, and 1 are composed to be time-base-decompressed so as to restore the audio signal. Thus, the audio signal can be also transmitted by a signal transmission system according to the DVI standard which can conventionally transmit only video.

Embodiment 4

Hereinafter, a signal transmission system according to a fourth embodiment will be described with reference to FIGS. 24 and 25. The fourth embodiment differs from any of the first to third embodiments. In this fourth embodiment, an audio signal is not transmitted by employing blanks in a video signal like in the first to third embodiments, but one of three transmission lines that are employed in a signal transmission system of the DVI standard is reserved as a transmission line for audio signal. That is, in the case of the DVI standard, transmission of the video signal is performed for component signals such as RED, GREEN and BLUE, while in the fourth embodiment, a mode in which transmission is performed with Y-color difference signals such as Y, Pb and Pr is added, and then an unused channel is allocated for the audio signal.

Figure 24:
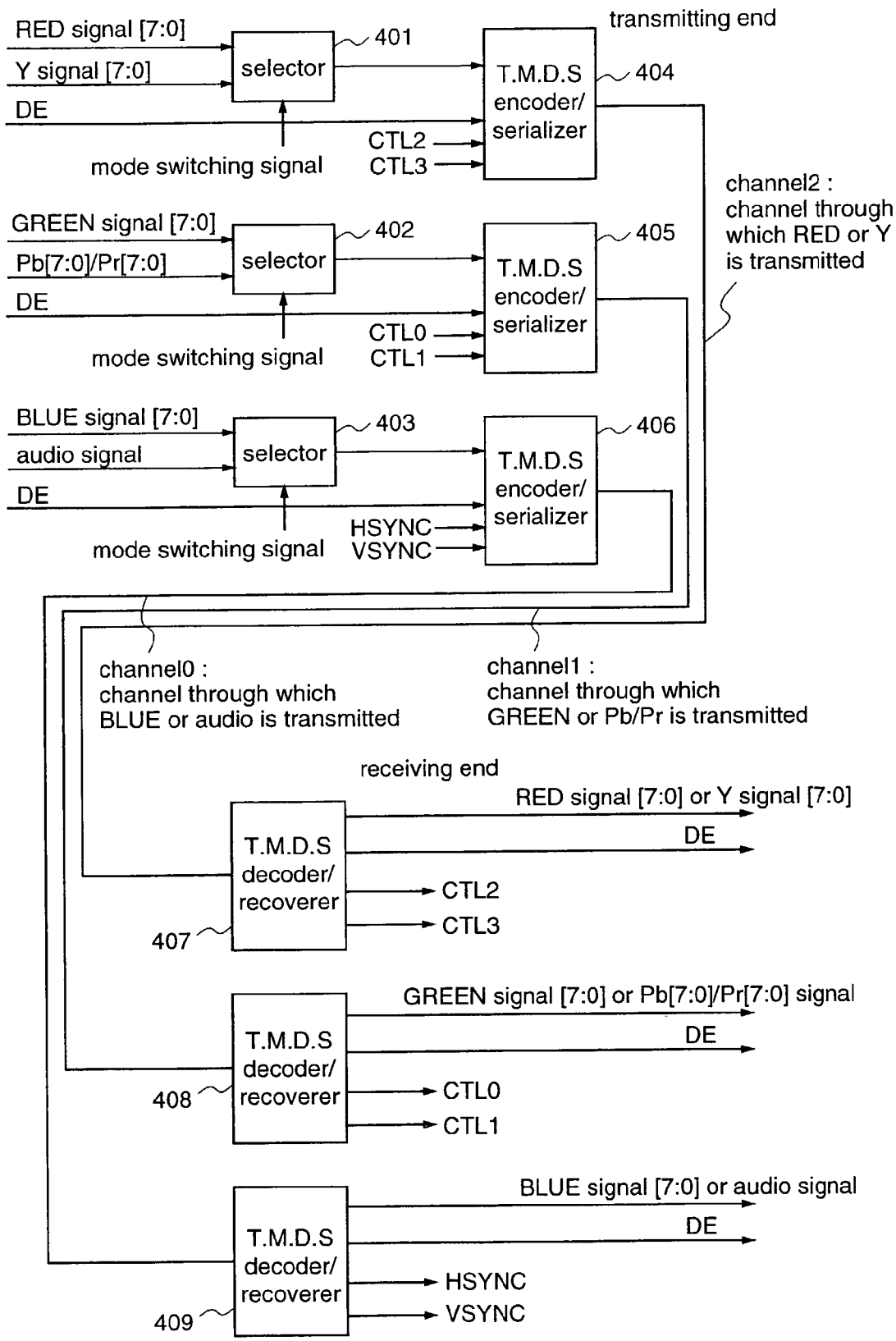
FIG. 24 is a diagram illustrating a structure of a signal transmission system according to a fourth embodiment.
Figure 25:
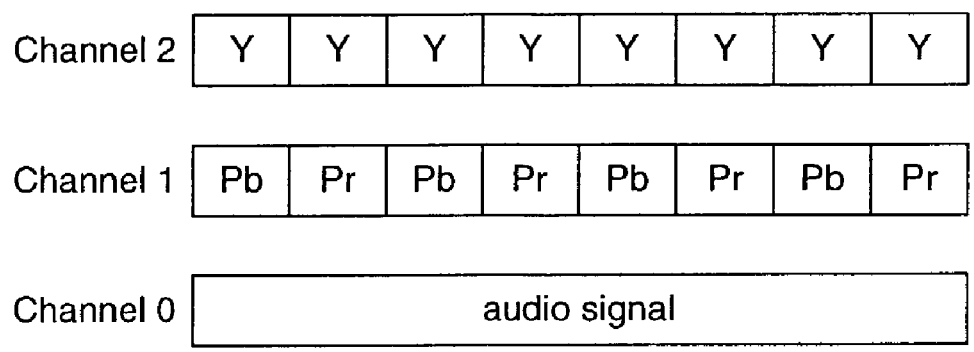
FIG. 25 is a diagram illustrating a signal image on a transmission line in the signal transmission system according to the fourth embodiment.
Figure 26:
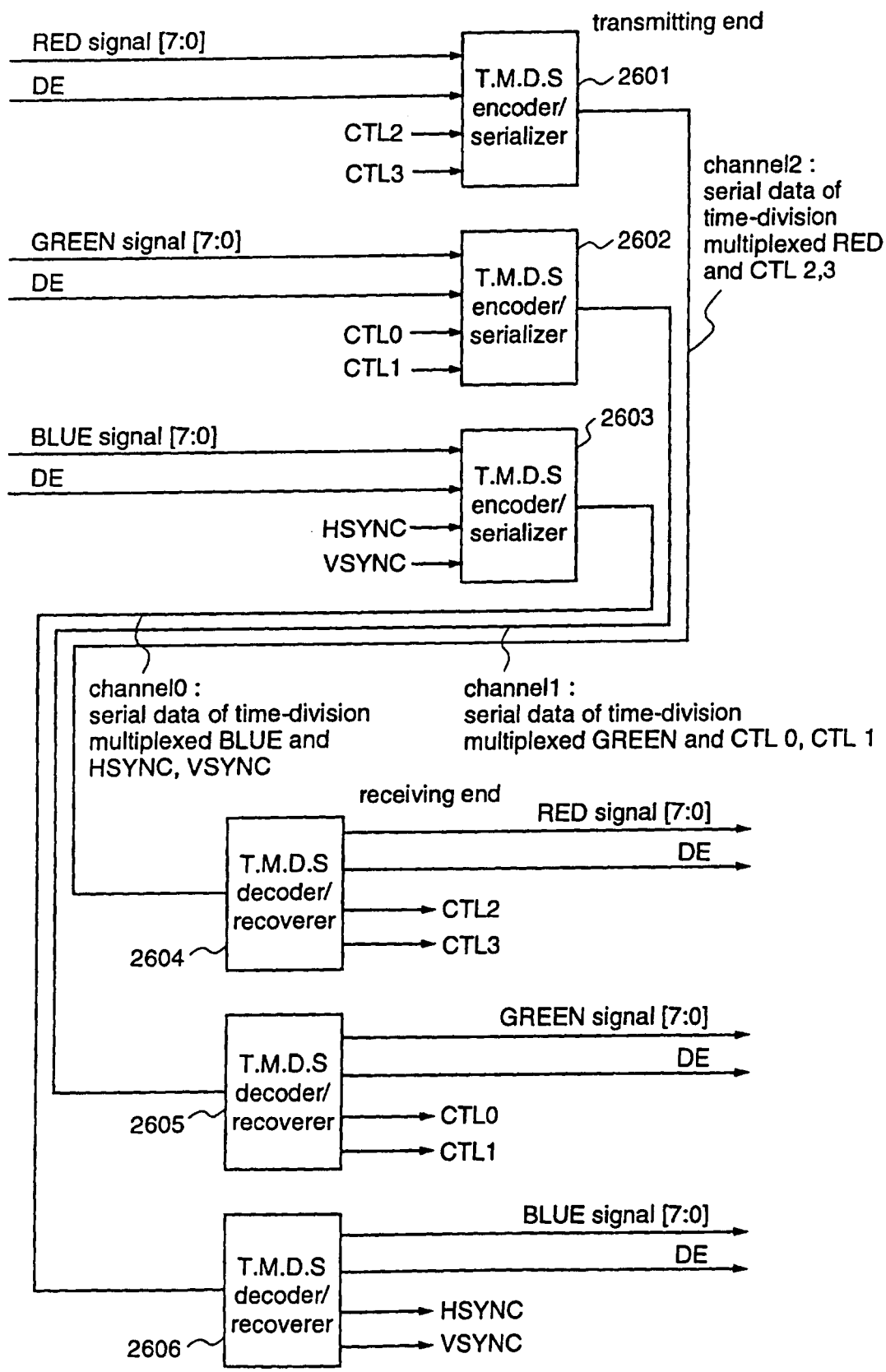
FIG. 26 is a diagram illustrating a structure of a conventional signal transmission system.

FIG. 24 is a diagram illustrating a structure of the signal transmission system according to the fourth embodiment.

In this figure, numeral 401 denotes a selector, which selects a RED signal or a luminance signal (Y), and supplies the selected signal to a TMDS encoder. Numeral 402 also denotes a selector, which selects a GREEN signal or a Pb/Pr signal. Numeral 403 denotes a selector, which selects one of a BLUE signal and an audio signal. Numerals 404 to 406 denote TMDS encoders/serializers and numerals 407 to 409 denote TMDS decoders/recoveres. These constituents are identical to those of the first to third embodiments.

The characteristic of this fourth embodiment is the use of Y color-difference transmission for transmitting video signals. As the Y color-difference transmission, there is, for example, 4:2:0 transmission. The 4:2:0 transmission is one in which the color signal rate is a half of the luminance signal rate, as shown in FIG. 25. More specifically, the number of samples of the color signal is a half of the number of samples of the luminance signal. Thereby, the video signal can be transmitted on two channels through the transmission lines of the DVI standard. More specifically, the luminance signal is transmitted on channel 2, and the color signal Pb/Pr is transmitted on channel 1. The audio signal is superimposed in unused channel 0. This audio signal is the original audio signal which is not time-base-compressed.

As described above, the signal transmission system according to the fourth embodiment further has the mode in which the transmission is performed with the Y color-difference signals such as Y, Pb and Pr, and an unused channel is allocated to the audio signal, thereby realizing a signal transmission system compliant with the DVI standard, in which the audio signal as well as the video signal can be transmitted.

Further, in the fourth embodiment, Y, Pb/Pr, and audio signals are allocated to channel 2, channel 1, and channel 0, respectively, but the allocation is not restricted to the above-mentioned manner.

Further, in the embodiments according to the present invention, multiplexing and transmission of signals are performed by the multiplexing part, but the multiplexing and transmission can be performed separately by different components.

APPLICABILITY IN INDUSTRY

A signal transmitter and a signal receiver according to the present invention are available as a signal transmission system compliant with the DVI standard, which can transmit an audio signal as well as a video signal.

The invention claimed is:

1. A signal transmitter based on digital visual interface (DVI) standard for connection to a signal receiver based on the DVI standard, the signal transmitter comprising:
 a time-base compression part operable to time-base-compress an audio signal employing a video sampling clock;
 a signal multiplexing part operable to multiplex the time-base-compressed audio signal and a video signal by employing a control signal, and output a video/audio multiplexed signal and the control signal to the signal receiver,
 wherein the control signal, employed by said signal multiplexing part to multiplex the time-based-compressed audio signal and the video signal, indicates an area of a synchronizing period of the video signal where the time-based-compressed audio data is located in the generated video/audio multiplexed signal.

2. The signal transmitter as claimed in claim 1, wherein the control signal includes a horizontal synchronizing signal and a vertical synchronizing signal.

3. The signal transmitter as claimed in claim 1, wherein the signal multiplexing part is operable to multiplex the time-base-compressed audio signal and the video signal when the control signal is a certain value.

* * * * *